US012657347B2

(12) United States Patent
Lindskog et al.

(10) Patent No.: US 12,657,347 B2
(45) Date of Patent: *Jun. 16, 2026

(54) STORAGE DEVICE BEING AUTHENTICATED TO HOST BY UTILIZING PHYSICALLY UNCLONABLE FUNCTION (PUF) FOR DATA ENCRYPTION/DECRYPTION

(71) Applicant: TELEFONAKTIEBOLAGET LM ERICSSON (PUBL), Stockholm (SE)

(72) Inventors: Niklas Lindskog, Lund (SE); Håkan Englund, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

This patent is subject to a terminal disclaimer.

(21) Appl. No.: 18/567,636

(22) PCT Filed: Jun. 7, 2021

(86) PCT No.: PCT/IB2021/054987
§ 371 (c)(1),
(2) Date: Dec. 6, 2023

(87) PCT Pub. No.: WO2022/259013
PCT Pub. Date: Dec. 15, 2022

(65) Prior Publication Data
US 2024/0273243 A1 Aug. 15, 2024

(51) Int. Cl.
*H04L 29/06* (2006.01)
*G06F 21/30* (2013.01)
(Continued)

(52) U.S. Cl.
CPC .............. *G06F 21/78* (2013.01); *G06F 21/30* (2013.01); *H04L 9/3278* (2013.01)

(58) Field of Classification Search
CPC ......... G06F 21/78; G06F 21/30; H04L 9/3278
See application file for complete search history.

(56) References Cited

U.S. PATENT DOCUMENTS 9,214,183 B2    12/2015  Van Rijnswou
10,079,678 B2    9/2018  Smith et al.
(Continued)

FOREIGN PATENT DOCUMENTS

CN          109522758 A      3/2019
CN          110233729 A      9/2019

OTHER PUBLICATIONS

Trusted Computing Group, "Trusted Computing Group and NVM Express Joint White Paper: TCG Storage, Opal, and NVMe", nvm Express, Aug. 2015.
(Continued)

*Primary Examiner* — Evans Desrosiers
(74) *Attorney, Agent, or Firm* — Withrow & Terranova, PLLC

(57) ABSTRACT

Systems and methods are disclosed herein for protecting data in a storage device by encrypting or decrypting the data with a Data Encryption Key (DEK). The storage device is communicatively coupled to a host. In one example, the storage device comprises at least one Physically Unclonable Function (PDF) configured to generate PDF responses based on challenges and an authentication output generation module configured to obtain a nonce from the host, obtain an input related to a first PDF response, generate an authentication output based on the input and the nonce using a One-Way Function (OWF), and provide the authentication output to the host. The storage device further comprises a DEK generation module configured to generate a DEK based on a second PDF response and a crypto module to perform encryption or decryption of data using the DEK.

19 Claims, 9 Drawing Sheets

(51) Int. Cl.
    *G06F 21/78*       (2013.01)
    *H04L 9/32*       (2006.01)

(56)                References Cited

U.S. PATENT DOCUMENTS

| | | |
|---|---|---|
| 10,097,348 B2 | 10/2018 | Kara-Ivanov et al. |
| 2010/0199103 A1 | 8/2010 | Van Rijnswou |
| 2014/0032933 A1* | 1/2014 | Smith ..................... G06F 21/31 |
| | | 713/193 |
| 2017/0279606 A1 | 9/2017 | Kara-Ivanov et al. |
| 2019/0342104 A1 | 11/2019 | Adams et al. |
| 2019/0342105 A1* | 11/2019 | Adams .................. H04L 9/0822 |
| 2020/0228351 A1 | 7/2020 | Kreft |
| 2021/0036873 A1 | 2/2021 | Kim et al. |

OTHER PUBLICATIONS

Trusted Computing Group, et al. "Trusted Computing Group and NVMe Work Group Joint White Paper: TCG Storage, Opal, and NVMe", Aug. 2015.

* cited by examiner

STORAGE DEVICE BEING AUTHENTICATED TO HOST BY UTILIZING PHYSICALLY UNCLONABLE FUNCTION (PUF) FOR DATA ENCRYPTION/DECRYPTION

PRIORITY CLAIM

This application is a national stage application of International Patent Application No. PCT/IB2021/054987, filed Jun. 7, 2021, the disclosure disclosures of which is hereby incorporated in its entirety by reference.

TECHNICAL FIELD

The present disclosure relates to a secure storage device and, more specifically, to a secure storage device that uses a Physically Unclonable Function (PUF) to generate or decrypt Data Encryption Keys (DEKs) and that enables authentication to a host before credentials are provided from the host to the storage device.

BACKGROUND

Physically Unclonable Functions (PUFs)

Physically Unclonable Functions (PUFs) are circuits, components, processes, or other entities capable of generating an output, such as a key, a digital identity, or authentication data. A PUF should be resistant to cloning. For example, a device having a PUF would be difficult to clone to generate the same output of the PUF with another device. PUFs are used to create a unique response by using implicit or explicit randomness. This response can be used for cryptographic or device identity purposes. Implicit randomness may include unpredictable manufacturing differences in semiconductor devices that can be exploited to create a device-unique response. On the other hand, explicit randomness means that the introduction of randomness requires extra steps during manufacturing or a later stage, e.g., at packaging.

A PUF comprises one or several subfunctions, sometimes called elements or components, which each contributes a part of the PUF response. One example of the subfunctions of a PUF is a ring-oscillator pair. A ring oscillator is formed by an uneven number of signal inverters in a ring, where gate delay propagation is used as a randomness source. The PUF response is based on a comparison between the two ring-oscillators where the number of oscillations at a given point is measured. In particular, the PUF response may be an identifier of the fastest ring oscillator or the slowest ring oscillator. Another example of the subfunctions of a PUF may be uninitialized Static Random-Access Memory (SRAM) cells, which have two possible states (0 and 1). Prior to power-up, the SRAM cell is in neither state. At power-up, the SRAM cell stabilizes in one of the two states. The PUF response is the entered state of a set of SRAM cells. Yet another example is an arbiter. An arbiter might be regarded as a digital race condition between two or more signal paths on a chip where a so-called arbiter circuit identifies a winning signal. The paths might comprise several switch blocks, which can alter the signal paths. For example, the PUF response can be an identification of the winning signal. In some PUF entities, the same subfunction (s) might generate several outputs by utilizing different parts of the PUF challenge. Each subfunction also has the property that it is physically unclonable, i.e. unique for the device. A PUF may therefore comprise several subfunctions which can be used as independent PUFs, albeit with fewer possible challenges and fewer response bits.

The PUF response can be used to create a unique device identity or a device-unique key without having to store the key in, e.g., Battery Backup Random Access Memory (BBRAM) or One Time Programmable (OTP) memory. Hence, it is much harder for an attacker to mount certain types of hardware attacks with the goal of recovering the key from a device using a PUF.

There are several types of PUFs, but all PUFs accept a challenge as input. The PUFs generally translate the challenge into either (i) a selection of at least one element within the PUF or (ii) a configuration of at least one element within the PUF. Depending on what type of PUF is used, the number of challenges, which are accepted by the PUF, can vary from just one to an exponential amount related to the number of subfunctions. In the present disclosure, the challenge is considered to be an input to the PUF that creates a specified number of response bits. The present disclosure may include activating the PUF several times using different subsections of the challenge where each subsection generates at least one part of the response.

Most PUF types additionally require helper data to function properly, i.e. to increase the possibility of recreating the same response given the same challenge. Some PUF types can remap the challenge-response mapping one or several times. I.e., after the remapping, some or all challenges may result in new responses.

A reconfigurable PUF can alter the entire challenge space, e.g. to make sure that all challenges receive a new response. An erasable PUF is a PUF that has the possibility to change responses of specific challenges. Alternatively, the PUF might respond with a null sequence, for example, all zeros, for challenges marked as "erased." When a PUF response (or a derivation thereof) is used to encrypt another cryptographic key, the PUF response is called a Key Encryption Key (KEK).

Self-Encrypting Drive (SED)

Encrypting digital information is essential for the protection of its confidentiality. Protection of data at rest is discussed in the present disclosure. Several solutions exist, i.e., with a granularity from encrypting files, containers, volumes, or entire disks. Encrypting the entire disk is called Full Disk Encryption (FDE), which may be performed both by a host using a software application and by a storage device, called a Self-Encrypting Drive (SED), using hardware. Throughout the present disclosure, the SED and the storage device are used interchangeably.

The SED is a term for a storage device that stores the data in encrypted form. The encryption happens seamlessly from the perspective of the host machine. The SED is popular because the SED does not increase a computation load on the main Central Processing Unit (CPU), while the software-based FDE does. The SED is potentially more resistant to cold boot and Direct Memory Access (DMA) attacks, where attackers can steal the encryption key from the computer's Random-Access Memory (RAM). Typically, the encryption itself is performed by a dedicated Advanced Encryption Standard (AES) accelerator on the SED.

The storage on a SED can generally be said to be divided into three regions, an administrative region, a credential storage region, and a data storage region. The data storage region may be divided into several ranges, sometimes called bands or sections. Each range may belong to a different user, but multiple users can also be configured to be able to unlock the same range independently.

In order to perform encryption on a SED, a Data Encryption Key (DEK), sometimes called a Media Encryption Key (MEK), is usually stored within a protected region of the drive. The DEK may be stored in cleartext, but the best practice recommendation is to store the DEK in an encrypted form. If the key is in plaintext, the disk storage is encrypted, but after power-up, the disk storage functions as a normal disk from the perspective of a user. If the DEK is encrypted, the user must supply a password used to derive an Authentication Key (AK), sometimes called the KEK, which decrypts the DEK. A SED may contain several DEKs encrypted with either the same or different passwords. Each DEK encrypts a specific range of the disk if the disk includes multiple ranges of data. If only one range exists, the DEK encrypts the entire data storage on the SED.

When the DEK(s) is stored in the SED in encrypted form, after the AK has decrypted the DEK(s), the decrypted DEK(s) are stored in volatile memory during an operation of the SED, enabling the decrypted DEK(s) to be used by a crypto module when needed. If the DEK(s) are erased, e.g., due to a power cycle, the password used to create the AK must be re-entered.

Aspects of SEDs may be standardized by standardization bodies, such as the Trusted Computing Group (TCG) Opal standard. The TCG Opal standard defines expected protocols and features of a SED device, e.g., supporting the AES with 128-bit keys or 256-bit keys and being able to erase keys upon request. The TCG Opal standard is mainly aimed at integrated and cloud-based drives, albeit nothing in the TGC Opal standard prohibits other drives, e.g., Universal Serial Bus (USB) connected drives, from conforming with the TGC Opal standard. There also exists a subset of the TCG Opal standard, called TCG Opalite, that supports fewer users and only a single range.

Advanced Technology Attachment (ATA) security is another standard relevant for the SED. However, the ATA security does not define any cryptographic capabilities for the storage devices, only passwords should be used to unlock the drive. The ATA security further allows "master passwords" (unless "master password capability—maximum" is used) that must be able to overrule all other passwords. Due to this restriction, no disk encryption keys may be derived from user passwords.

SUMMARY

Embodiments of a storage device being authenticated by utilizing at least one Physically Unclonable Function (PUF) for data encryption and/or decryption and related methods are disclosed herein. In one embodiment, the storage device comprises at least one PUF configured to generate a first PUF response based on a first challenge and to generate a second PUF response based on a second challenge. The storage device further comprises an authentication output generation module configured to obtain a number used only once (nonce) provided by a host, obtain a first input related to the first PUF response, generate an authentication output based on the first input and the nonce using a first One-Way Function (OWF), and provide the authentication output to the host. The storage device further comprises a Data Encryption Key (DEK) generation module configured to generate a DEK based on at least the second PUF response and a crypto module configured to perform encryption of data from the host to be stored in encrypted data storage of the storage device using the DEK and/or decryption of data being accessed by the host from the encrypted data storage of the storage device using the DEK. By generating and providing the authentication output to the host, the host is able to authenticate the storage device, e.g. prior to the host providing a credential to the storage device.

In one embodiment, the authentication output generation module of the storage device is configured to obtain one or more parameters from storage and generate the authentication output based on the first input, the nonce, and the one or more parameters using the first OWF. The one or more parameters comprise (a) an identifier of the storage device, (b) boot measurements about digests from booted components and activation of debug mode, (c) hardware or integrity measurements about states of physical components or integrity of casing, (d) a stored OWF configuration parameter, or (e) a combination of any two or more of (a)-(d). In one embodiment, the storage device further comprises an error correction module configured to perform error correction of the first PUF response based on helper data to provide an error-corrected PUF response as the first input to the authentication output generation module.

In one embodiment, the DEK generation module of the storage device is further configured to receive a credential from the host. In one embodiment, the authentication output generation module is configured to provide the authentication output to the host prior to the credential of the host being received at the storage device.

In one embodiment, the DEK generation module of the storage device is further configured to obtain a second input related to the second PUF response and to generate a DEK based on at least the credential and the second input. In one embodiment, the storage device further comprises an error correction module configured to perform error correction of the second PUF response based on helper data to provide a second error-corrected PUF response as the second input to the DEK generation module. In one embodiment, the DEK generation module of the storage device comprises a Key Derivation Function (KDF) configured to receive the credential from the host, obtain the second input related to the second PUF response, and generate the DEK based on the second input and the credential.

In one embodiment, the storage device further comprises a second OWF configured to obtain a second input related to the second PUF response, receive the credential from the host, and generate a transformed output based on the second input and the credential. The DEK generation module is further configured to obtain the transformed output from the second OWF, obtain an encrypted DEK, and decrypt the encrypted DEK based on the transformed output to thereby generate a DEK. In one embodiment, the storage device further comprises an error correction module configured to perform error correction of the second PUF response based on helper data to provide an error-corrected second PUF response as the second input to the second OWF.

In one embodiment, the storage device further comprises a second OWF configured to receive a credential from the host and generate a first output based on the credential. The at least one PUF is further configured to obtain the first output from the second OWF and generate a second PUF response based on the first output. The DEK generation module is further configured to obtain an input related to the second PUF response and generate a DEK based on the input related to the second PUF response. In one embodiment, the DEK generation module of the storage device comprises a KDF configured to generate the DEK based on the input related to the second PUF response. In one embodiment, the storage device further comprises an error correction module configured to perform error correction on the second PUF response based on helper data to provide an error-corrected second PUF response as the input to the DEK generation module.

In one embodiment, the storage device further comprises a second OWF configured to receive a credential from the host, obtain an input related to the second PUF response, and generate an output based on the input and the credential, an eXclusive OR (XOR) module configured to obtain the output from the second OWF, obtain an offset from storage, and generate an XOR output based on the output from the second OWF and the offset. The DEK generation module of the storage device is further configured to obtain the XOR output from the XOR module and generate a DEK based on the XOR output. In one embodiment, the DEK generation module comprises a KDF configured to obtain the XOR output from the XOR module and generate the DEK based on the XOR output.

In one embodiment, the storage device further comprises an error correction module configured to perform error correction on the second PUF response based on helper data to provide a second error-corrected PUF response as the input to the second OWF.

In one embodiment, the storage device further comprises a second OWF configured to receive a credential from the host and generate an output based on the credential, an XOR module configured to obtain the second PUF response, obtain an offset from storage, and generate an XOR output based on the second PUF response and the offset. The at least one PUF is further configured to generate a second PUF response based on the output obtained from the second OWF. The DEK generation module is further configured to obtain the XOR output from the XOR module and generate a DEK based on the XOR output. In one embodiment, the DEK generation module of the storage device comprises a KDF configured to obtain the input related to the XOR output and generate the DEK based on the input related to the XOR output. In one embodiment, the storage device further comprises an error correction module configured to perform error correction on the XOR output based on helper data to provide an error-corrected XOR output as the input to the DEK generation module.

In one embodiment, the storage device further comprises a third OWF and an authentication module. The third OWF is configured to obtain the DEK from the DEK generation module and generate an output based on the DEK, and the authentication module is configured to obtain the output from the third OWF and a transformed version of the DEK from storage and authenticate the DEK based on the output and the transformed version of the DEK. In one embodiment, the KDF of the storage device is additionally configured to receive one or more sets of parameters from storage and use the set of parameters to configure the KDF prior to generating the DEK.

Corresponding embodiments of a method implemented in a storage device are also disclosed. In one embodiment, a method of operation of a storage device for protecting data comprises generating a first response based on a first challenge, generating a second PUF response based on a second challenge, obtaining a nonce provided by a host, and obtaining a first input related to the first PUF response. The method further comprises generating an authentication output based on the first input related to the first PUF response and the nonce using a first OWF and providing the authentication output to the host and providing an authentication output to the host. The method further comprises generating a DEK based on at least the second response and performing encryption of data from the host to be stored in encrypted data storage of the storage device using the DEK and/or decryption of data being accessed by the host from the encrypted data storage of the storage device using the DEK.

In one embodiment, the method further comprises receiving a credential from the host. Providing the authentication output to the host is performed prior to the credential of the host being received at the storage device.

In one embodiment, the method further comprises obtaining a second input related to the second PUF response, generating, via a second OWF, a transformed output based on the second input and the credential. Generating the DEK of the method further comprises obtaining an encrypted DEK and decrypting the encrypted DEK based on the transformed output to thereby generate a DEK.

In one embodiment, the method further comprises generating a first output based on the credential, wherein generating the second PUF response comprises generating the second PUF response based on the first output and generating the DEK comprises obtaining an input related to the second PUF response and generating the DEK based on the input related to the second PUF response.

In one embodiment, the method further comprises obtaining an input related to the second PUF response, generating, by the second OWF, an output based on the input and the credential, obtaining an offset associated with a user of the host and generating an XOR output based on the output and the offset, and generating a DEK based on the XOR output.

In one embodiment, the method further comprises generating an output based on the credential, generating, by the second OWF, a second PUF response based on the output, obtaining an offset associated with a user of the host, generating an XOR output based on the second PUF response and the offset, wherein generating the DEK comprises generating the DEK based on the XOR output.

In one embodiment, the method further comprises generating, by a third OWF, a transformed version of the DEK, obtaining a stored transformed version of the DEK, and authenticating the DEK based on a comparison of the generated transformed version of the DEK and the stored transformed version of the DEK.

BRIEF DESCRIPTION OF THE DRAWINGS

The accompanying drawing figures incorporated in and forming a part of this specification illustrate several aspects of the disclosure, and together with the description, serve to explain the principles of the disclosure. Optional features are represented by dashed boxes.

DETAILED DESCRIPTION

Figure 1:
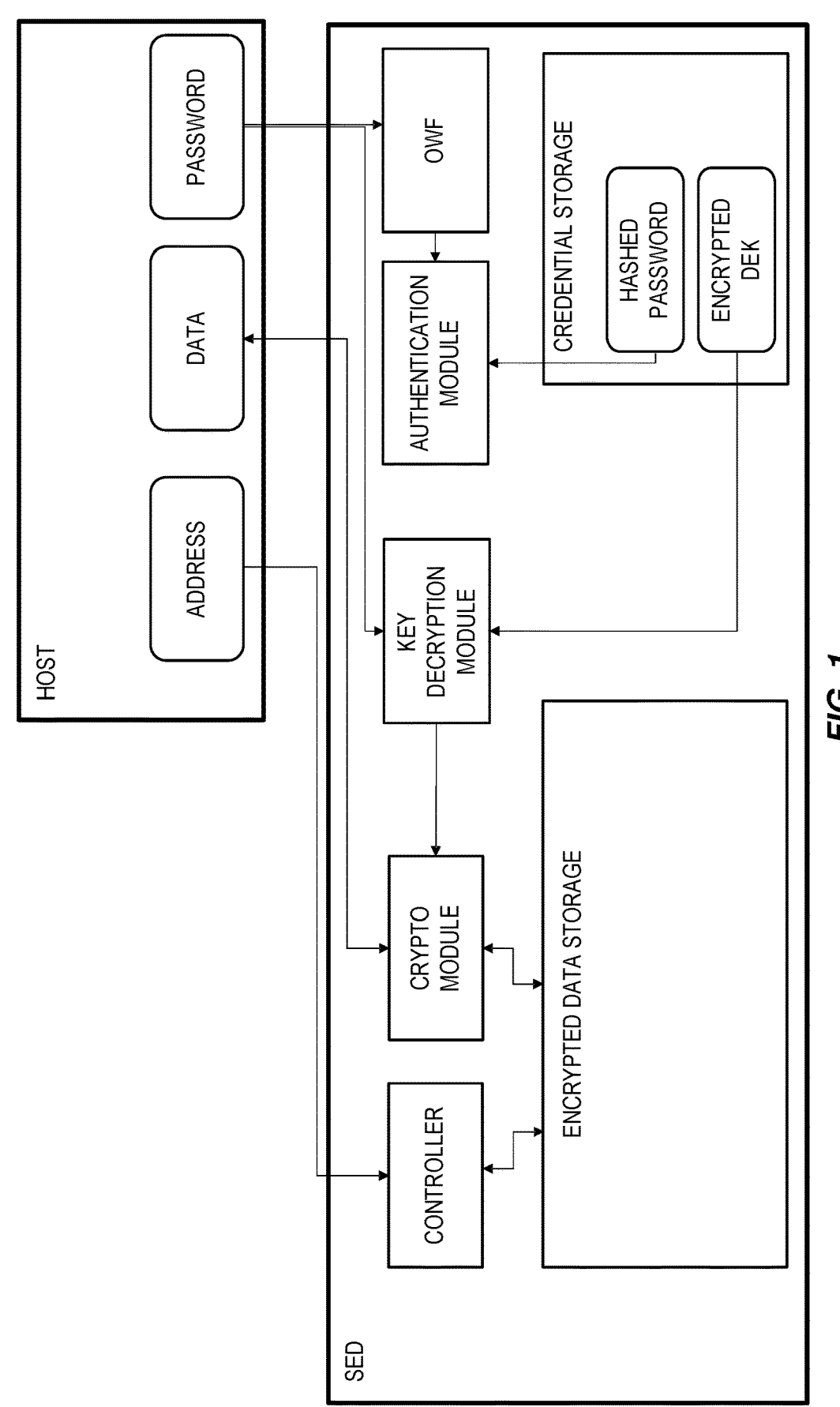
FIG. 1 illustrates one example of current implementations of a Self-Encrypting Disk (SED) and a host under the Trusted Computing Group (TCG) Opal standard.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Before describing embodiments of the present disclosure, a discussion of existing solutions and problems associated to the existing solutions is beneficial. In this regard, U.S. Pat. No. 10,079,678 B2, titled "Providing access to encrypted data" to Smith et al. (hereinafter "Smith"), describes a solution where an authenticated user receives a Physically Unclonable Function (PUF) key to decrypt a storage module, e.g. a Full Disk Encryption (FDE) storage device. The storage device itself in Smith does not perform any computation but receives a Data Encryption Key (DEK) from a "non-transitory computing device-readable storage medium." In some embodiments of Smith, the received DEK is used to unlock the storage device.

U.S. Pat. No. 10,097,348 B2, titled "Device bound encrypted data" to Kara-Ivanov et al. (hereinafter "Kara-Ivanov"), describes a storage device that implements a solution where the hash of incoming data is used to as a PUF challenge. The PUF in Kara-Ivanov generates a response that, together with a user-supplied password, creates a cryptographic key. The key in Kara-Ivanov is, in turn, used to encrypt data.

Chinese Patent Application Publication No. CN109522758A, titled "Hard disk data management method and hard disk" to Suzhou (hereinafter "Suzhou"), has the same concept as Kara-Ivanov, but instead, uses address information of logical block or data classification information to derive a challenge. Suzhou's solution does not use a credential.

U.S. Pat. No. 9,214,183 B2, titled "Secure storage" to Rijnswou (hereinafter "Rijnswou"), describes a system for storing digital data. The system of Rijnswou contains a storage device such as a hard drive, a compact disk, or an embedded memory. In Rijnswou, each unit of data has an identifier supplied to the PUF, possibly together with a username and an authentication token.

Chinese Patent Application Publication No. CN110233729A, titled "A kind of encryption solid-state disk key management method based on PUF" to BICTA et al. (hereinafter "BICTA") describes a method where a Solid-State Drive (SSD) with a PUF can be decrypted using a hardware token (Ukey). The token acts like a middleman between the host and the SSD and verifies the user password. The DEK to encrypt the SSD is derived by using a PUF response and the hash of the password. The Ukey and the SSD authenticate each other by encrypting random numbers with pre-shared secrets. The keys used to generate/decrypt the DEK are divided between the Ukey and SSD using threshold cryptography.

FIG. 1 illustrates an example of current implementations of a SED under the Trusted Computing Group (TCG) Opal standard. As illustrated, the SED includes a One-Way Function (OWF), an authentication module, a key decryption module, and a crypto module. The OWF receives a password from a host and forwards a transformed password (e.g., a hashed password) to the authentication module. The authentication module then authenticates the received password by comparing the transformed password with a hashed password stored at the SED. If the authentication module determines that the transformed password is valid and legitimate, an encrypted storage key is forwarded to the key decryption module. Next, the key decryption module generates a DEK based on the received encrypted storage key. The crypto module uses the DEK to encrypt incoming data to the SED or to decrypt outgoing data to the host.

The main problem with all current solutions is that there are no means for the user to ensure that data is being read or written to an authentic storage device. For example, it is possible that an attacker physically replaces a storage device on a victim's laptop. The aim of such an attack is to sniff the passwords of the storage device and to unlock the storage device or even to collect sensitive data written in the storage device. It is, hence, beneficial to be able to authenticate the storage device before supplying any password or writing sensitive data to the storage device.

Another important problem is a need to store encrypted DEK(s) on the storage device, after encrypting those keys with passwords. An attacker who manages to extract the encrypted DEK(s) from a storage device can use offline brute force or dictionary attacks to crack the passwords used to encrypt the DEK(s). In other words, the attacker does not need to get access to the storage device after having extracted the encrypted DEK(s). A brute-force attack is an attempt to guess a secret (for example, a password or an encryption key) by systematically checking every possible option. A dictionary attack is an attempt to guess a password by trying commonly used passwords. The increasing computational power of computers makes it computationally practical to guess longer and longer passwords.

Another issue with the current implementations of the SED is that, when the SED is unlocked, the decrypted keys are kept in a volatile memory and might be exposed to attacks, especially if the Random-Access Memory (RAM) is placed off-chip. Furthermore, when the SED enters a low energy mode, e.g., sleep mode, the storage is allowed, according to the TCG Opal standard, to store the current state of the volatile memory to a non-volatile memory, as well as decrypted keys, in non-volatile memory. Another more expensive alternative is to keep power on for a small portion of the device where the keys are stored, possibly backed up by a battery.

Generating entropy might be problematic for storage devices as the storage devices may lack the correct implementation or capability to create true randomness. This makes the SED vulnerable to weak key attacks and attacks aimed at, e.g., Pseudo-Random Number Generator (PRNG) implementations.

The TCG Opal standard requires that several users can access the same data using different passwords. With the current SED solutions, the TCG Opal standard requires the same key to exist in several versions, encrypted with different passwords. However, if the encryption is based on Exclusive OR (XOR)-encrypting the key with the plaintext password, physical attacks extracting the ciphertext lead to recovery of the key. Hence, the physical attacks may jeopardize all users, as knowledge of the key exposes all passwords.

Alternatively, a commonly used procedure is to derive a DEK encryption/decryption key using a Key Derivation Function (KDF), e.g., Password-Based Key Derivation Function 2 (PBKDF2) and use the derived key to encrypt the DEK. The encrypted version of the DEK is stored for each user/password. As the encrypted DEKs are stored on disk and potentially can be extracted by a physical attack, the DEK and passwords are still vulnerable to an offline brute-force/dictionary attacks.

BICTA (Chinese Patent Application Publication No. CN110233729A) uses a hashed password and a PUF to create a DEK to encrypt the drive. The disclosure in BICTA, however, requires a third component, a hardware token device (Ukey). In BICTA, the password is checked by the Ukey, which requires an additional authentication procedure between the Ukey and the SSD. Furthermore, BICTA claims a solution combining/encrypting the DEK with a storage key divided between the SSD and the Ukey using a threshold encryption. Finally, there is no support for multiple keys or users.

None of the relevant art discussed above includes an authentication solution where the drive is authorized towards the host. In addition, the followings are some examples of the differences between the relevant art and the present disclosure. Smith (U.S. Pat. No. 10,079,678 B2) does not describe a storage device, such as a SED, which has a crypto module and a PUF. All cryptographic operations and the PUF are outside of Smith's device. Kara-Ivanov (U.S. Pat. No. 10,097,348 B2) describes a storage device with inline crypto capabilities. The storage device of Kara-Ivanov uses a hash of the data to generate a unique key for each content, using a PUF, where the content is exemplified by a digital image. However, as the hash of the data decides the challenge to the PUF and thereby the key, the key will be altered upon every time to the content is altered. To determine the key, the hash of the data must also be calculated every time the updated content is written. Suzhou (Chinese Patent Application Publication No. CN109522758A) does not describe any user input such as a password to generate a key. Rijnswou (U.S. Pat. No. 9,214, 183 B2) discloses a PUF that may be co-located with the storage device. However, Rijnswou encrypts data using an identifier for each data unit. In contrast, the present disclosure may create different keys by using a differently seeded KDF. In the present disclosure, the identifier is used as a challenge for the PUF but is not combined with an output of the PUF.

The present disclosure discloses a secure storage device that uses a PUF to generate DEKs. Prior to exposing any credentials to the storage device, the host authenticates the storage device and possibly its state. Each authentication is unique and cannot be replicated due to the use of a host-chosen nonce (number used once). After successful authentication, the host supplies a credential and, optionally, a challenge to the storage device. The credential and/or the challenge may be given to the PUF, and the PUF generates a PUF output based on the received credential and/or the challenge. Alternatively, the credential and are combined with a PUF response, and such combination is given to a KDF. Then, the KDF generates a KDF output based on the received credential and/or the challenge and the PUF response.

The present disclosure also describes a storage device that stores encrypted data. All data belonging to read/write requests, by an authorized host, are decrypted/encrypted within the storage device by a crypto module. That is, the host does not know that the drive is encrypted after the host has authenticated the storage device and the host has unlocked the storage device with a credential such as a password. The storage of the storage device may be divided into several areas, where at least one area is allocated to store credentials and at least one area is allocated to store data. The data storage may comprise several ranges. Each range of the data storage may be encrypted by a unique DEK.

The PUF output or the KDF output may be validated to authenticate that the credential is valid. The output of the KDF is used to create a DEK, which, in turn, is used to encrypt a range of data on the storage device. Each user may produce several different DEKs to protect different ranges. DEKs belonging to the same user may be created from the same PUF challenge by using different parameters to the KDF. Thus, different users can also unlock the same storage device.

The present disclosure describes an encrypted storage device where no keys are stored on the storage device itself nor on any external device. Thus, there are no keys that can be overwritten, stolen, injected with errors, or brute-forced offline by an attacker. Further, there are no credentials stored in clear text on the storage device, nor any credentials vulnerable to offline attacks. The authentication of the user is done on one-way-transformed combinations of PUF output and user credentials. The same PUF may be used for both authentication and encryption by dividing the challenge space of the PUF and/or reconfiguring the PUF differently for the two phases. Authentication and encryption phase may also use different PUFs. Prior to exposing any credentials to the storage device, an authentication procedure is performed where the storage device provides proof that the storage device is legitimate and in the correct state. This procedure protects the storage device against several attacks where the storage device is replaced, tampered with physically or where the storage device has malicious firmware. The present disclosure is compliant with relevant standards for encrypted hard drives such as TCG Opal 2.0, Opalite 2.0 and Advanced Technology Attachment (ATA) security. The present disclosure also describes that, instead of using DEKs stored on the storage device, which may be vulnerable to probing attacks, a response generated by the PUF ("PUF response") may be used to directly derive DEKs. This makes it more difficult for an attacker to extract any key material as the key is generated upon request rather than being present in a non-volatile memory.

Figure 2:
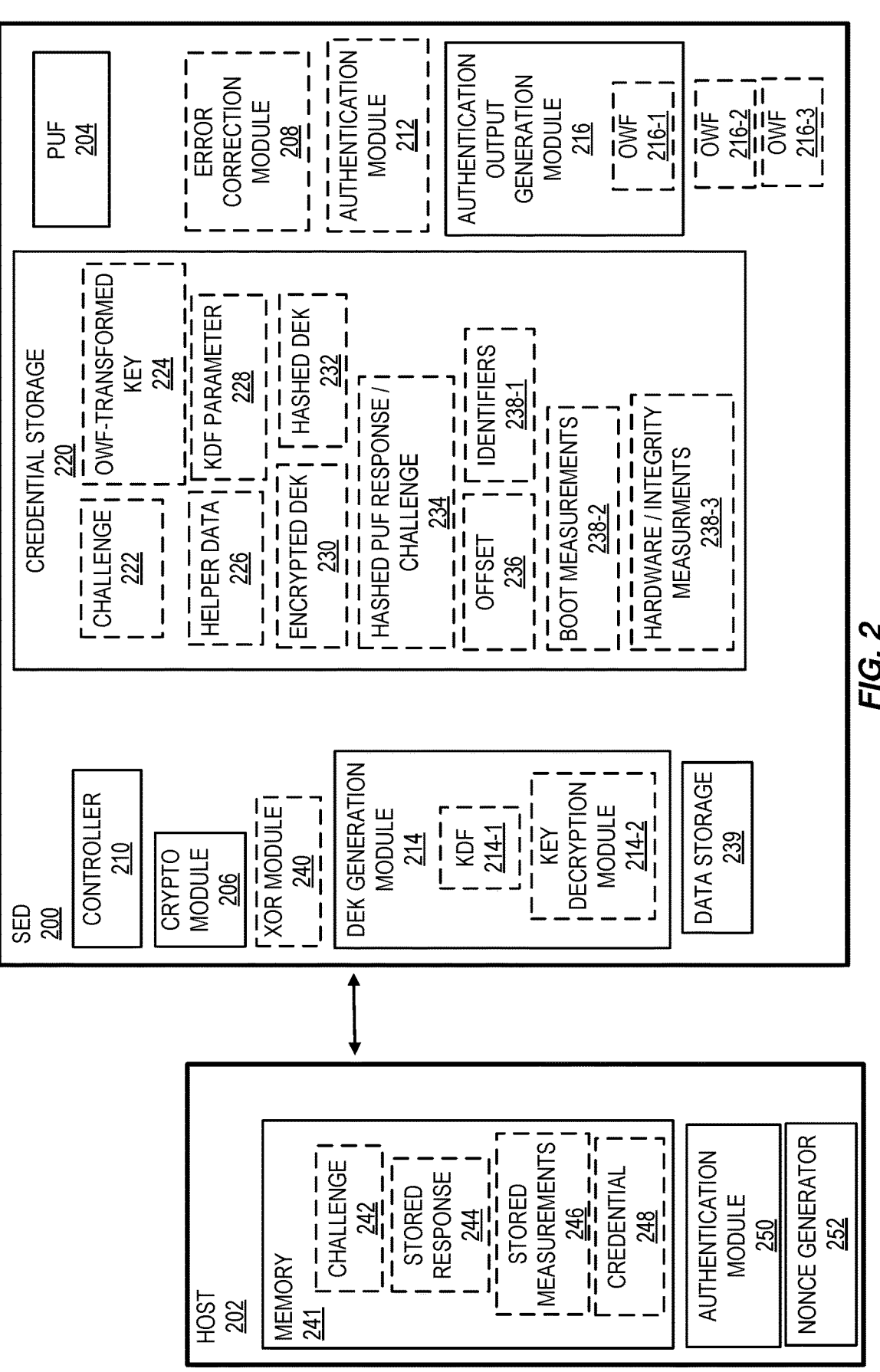
FIG. 2 illustrates components of a host and a SED that utilizes a Physically Unclonable Function (PUF) and generates a Data Encryption Key (DEK).

FIG. 2 illustrates components of a SED 200 and a host 202, where the SED 200 utilizes the PUF 204 to generate a DEK(s) after authenticating a credential received from the host 202 in accordance with one embodiment of the present disclosure. Optional components are represented by dashed lines/boxes. The SED 200 may include the following components:

PUF 204: The at least one PUF 204 takes a challenge and returns a device-unique response. In some embodiments, a PUF with many challenge-response pairs is preferred. In other embodiments, a PUF with only one or a few challenge-response pairs can also be used.

Crypto module 206: The crypto module 206 handles cryptographic procedures (e.g., encryption and/or decryption). For TCG Opal-compliant devices, the crypto module 206 supports the Advanced Encryption Standard (AES), but other symmetric cryptographic algorithms may additionally or alternatively be supported by the crypto module 206. The crypto module 206 may support one or several modes relevant for disk encryption, such as Liskov, Rivest, and Wagner (LRW) and XOR-encrypt-XOR Tweaked-codebook mode with ciphertext Stealing (XTS).

Error correction module 208: The error correction module 208 corrects PUF responses based on helper data 226 (e.g., error-correcting codes) that contains response-specific information and/or general knowledge regarding the behavior of the PUF 204.

Controller 210: The controller 210 receives requests from the host 202 for reading/writing data into/out of the SED 200.

Authentication module 212: The authentication module 212 validates an output of an OWF or a DEK that is generated based on a credential 248 received from the host 202; thus, the authentication module 212 authenticates the credential 248. For example, the authentication module 212 obtains an output from an OWF 216-3, which is generated based on the credential 248 received from the host 202 or (b) a DEK obtained from a KDF 214-1, which is also generated based on the credential 248. In one embodiment, by comparing the output from the OWF 216-3 with a transformed version of a key 224 or a hashed PUF response/challenge 234 obtained from the credential storage 220, the authentication module 212 may validate the output from the OWF 216-3 and thus, authenticate the credential 248 received from the host 202. In one embodiment, by comparing the DEK from the KDF 214-1 with a parameter obtained from the credential storage 220, the authentication module 212 may validate the DEK and thus, authenticate the credential 248 received from the host 202. A non-limiting example of the parameter a hashed DEK 232.

DEK generation module 214: The DEK generation module 214 may comprise the KDF 214-1 and/or a Key decryption module 214-2.

KDF 214-1: In some embodiments, the KDF 214-1 is used to create a cryptographic key (i.e., a DEK) from an input that is based on the PUF response. The KDF 214-1 can receive several parameters. Depending on the particular embodiment, the KDF 214-1, such as Argon2, Scrypt, and Password-Based Key Derivation Function 2 (PBKDF2), could be an OWF or a more complex KDF function to create a key that meets a specific criterion, such as PBKDF2.

Key decryption module 214-2: In some embodiments, the key decryption module 214-2 is used to decrypt encrypted data, such as encrypted DEK, based on an encryption key (e.g., generated by the KDF 214-1) based on an input that is based on the PUF response.

Authentication output generation module 216: The authentication output generation module 216 may comprise an OWF 216-1, which is used to authenticate the SED 200.

OWF 216: The OWF 216 is a function that is easy to compute on every input but hard to invert given the image of a random input. An example of the OWF 216 is a hash function. The OWF 216-1 may be used to authenticate the SED 200. The OWF 216-2 may be used to create a DEK. The OWF 216-3 may be used to authenticate a DEK. 216-1, 216-2 and 216-3 may be embodied by the same OWF but with different parametrization.

Credential storage area 220: The credential storage area 220 contains non-user-accessible data associated with the PUF 204 or, in some embodiments, encrypted keys. Examples of the non-user-accessible data are:

Challenge 222: The challenge 222 is provided to the PUF 204. The challenge is based on (a) the at least one credential, (b) a stored, pre-generated challenge, or (c) a combination thereof. One aspect of the challenge is that the challenge is unique to a user's credential. The challenge may be pre-generated based on each user's credential. In the case where a group of users should be able to access the same data, i.e., a group key derivable by each individual in the group, the challenge may be, instead, unique for the group. Also, in some embodiments, the challenge is not derived from the user-supplied credential, rather a randomly generated challenge is used. This approach may be used, e.g., as long as the number of randomly generated challenge is sufficiently large; thus, collisions among the randomly generated challenges are unlikely. In some embodiments, the challenges may be stored in a lookup table where each of the challenges is connected or associated with each user's credential.

OWF-transformed key 224: The OWF-transformed key 224 is a key transformed (e.g., hashed) by an OWF.

Helper data 226: In some embodiments, the helper data 226 is used by the error correction module 208 to correct errors in PUF responses. The PUF 204 may generate PUF responses many times to facilitate the future generation of a stable response. The helper data 226 may be generated based on an analysis the multiple instances of the PUF responses generated by the PUF 204. Alternatively, the helper data 226 may be predetermined and stored in the SED 200, based on general knowledge regarding the PUF 204 (e.g., discarding unstable bits).

KDF parameter 228: In some embodiments, the KDF 214-1 receives the KDF parameter 228 and uses the parameter to generate a different DEK based on the same PUF response. Non-limiting examples of the KDF parameter 228 are a credential supplied by a user, the number of iteration desired, a length of input/output, a sequential number, a randomly generated number, and parameters of a cryptographic algorithm. For example, PBKDF2 has five KDF parameters; the master password from which a derived key is generated, a cryptographic salt, the number of iterations desired, bit length of derived key, and if applicable, a selection of different pseudo-random functions (e.g., a keyed Hash-based Message authentication Code (HMAC)) which is used iteratively.

Encrypted DEKs 230: In one embodiment, encrypted DEKs are stored in the credential storage 220 of the SED 200. Each DEK is encrypted using a key that is generated based on a PUF response or an input derived from a PUF response.

Hashed DEK 232: A DEK is transformed (e.g., hashed) and saved in the credential storage 220.

Hashed PUF response/challenge 234: A PUF response and/or a challenge is transformed (e.g., hashed) and saved in the credential storage 220.

Offset 236: In one embodiment, the offset 236 defines the bitwise binary difference between a first PUF response (e.g., generated responsive to a challenge that is associated to the credential of a first user) and a second PUF response (e.g., generated responsive to a challenge that is associated to the credential of a second user), where the first PUF response is used to generate a cryptographic key (e.g., a DEK that is common to both the first user and the second user where, e.g., the first and second users both have access to the same data range(s) of the secure data storage 239). In one embodiment, the offset 236 is used by the XOR module 240 to generate the first PUF response from the second PUF response.

Identifiers 238-1, Boot measurements 238-2, Hardware/Integrity measurements 238-3: The SED 200 may save manufacturer-programmed identifiers 238-1, boot measurements 238-2 (e.g., digests from booted components and activation of debug mode), or hardware measurements 238-3 (e.g., states of physical components and integrity of casing) and provide those data to the host 202.

Data storage 239: The data storage 239 stores encrypted user data. The data storage 239 may comprise several ranges, encrypted with different keys and possibly belonging to different users.

XOR module 240: In some embodiments, the XOR module 240 uses a particular user's offset 236 to transform a PUF response generated specifically based on the particular user's credential into a common PUF response that is then used to generate a common cryptographic key (e.g., DEK) used to encrypted/decrypt a range(s) of data that is shared by the particular user and one or more additional users.

The host 202 may comprise a memory 241 containing a challenge 242, a stored response 244, stored measurements 246, and a credential 248. The stored response 244 is a PUF response that the host 202 receives from the PUF 204 or the error correction module 208 of the SED 200. The stored measurements 246 are expected values of the identifiers 238-1, the boot measurements 238-2, and/or the hardware/Integrity measurements 238-3 that the host 202 receives from the SED 200. Further, the host 202 may comprise a host's authentication module 250 and a nonce generator 252.

Figure 3:
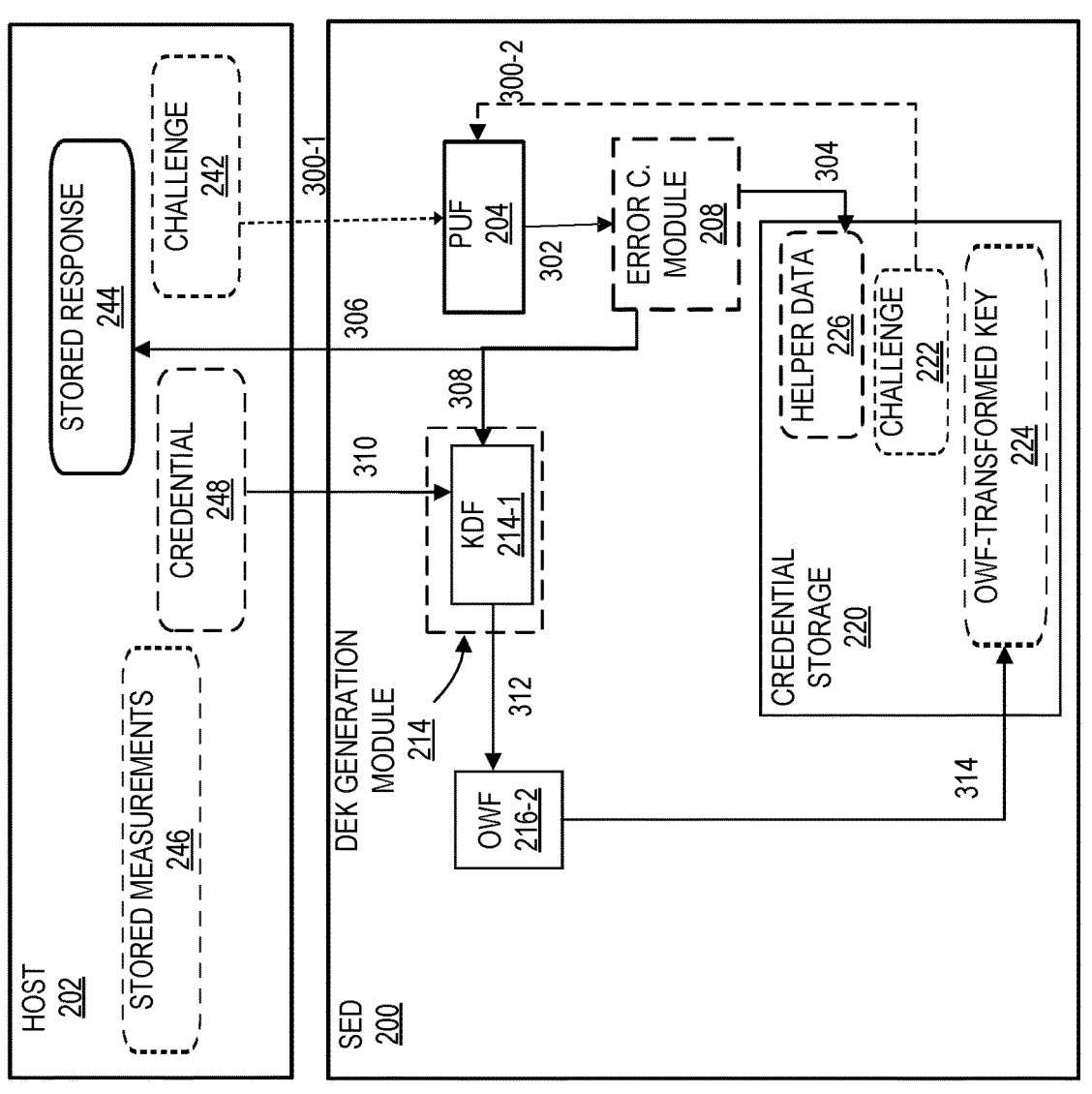
FIG. 3 illustrates one example of the SED that provides a PUF response to the host that supplies its credential to the SED during a registration phase in accordance with one embodiment of the present disclosure.

The storage device of the present disclosure has three phases (or modes): a registration phase, an authentication, and an encryption/decryption phase. FIG. 3 illustrates one example of the SED 200 that provides a PUF response to the host that supplies its credential to the SED 200 during the registration phase.

The registration phase can take place during manufacturing or upon a first use of the SED 200 by a user. Different users may use different challenges to perform authentication of the SED 200. The process in the registration phase can also be repeated at a later stage where earlier challenges used for authentication can be put in a revocation list or erased by an erasable PUF.

In the registration phase, the host 202 reads out an authentication response from the SED 200. The host 202 may also store correct values of measurements 246 to be used during the authentication phase, which is described below. The host 202 may also supply its credential to the SED 200 to generate the DEK and allow a one-way transformed version of the key (i.e., the OWF-transformed key 224) to be stored in the SED 200.

Step 300: In step 300, a challenge is provided to the PUF 204 to be used when authenticating the SED 200. In one embodiment, the host 202 provides the challenge to the credential storage 220 of SED 200, where the challenge is then provided to the PUF 204 to be used when authenticating the SED 200 (step 300-1). Alternatively, the challenge to be used when authenticating the SED 200 is a stored challenge 222, where the stored challenge 222 is provided to the PUF 204 when authenticating the SED 200 (step 300-2). Alternatively or additionally, a challenge is provided to the PUF 204 to be used when creating the DEK (step 308, 310, 312).

Step 302: The PUF 204 generates a PUF response based on the challenge to be used when authenticating the SED 200. In one embodiment, this PUF response is provided to the host 202 as an authentication response and, as such, this PUF response is also referred to herein as an "authentication response". Note that the PUF response may be generated many times to facilitate generation of helper data (see step 304 below) to provide error correction when generating a PUF response based on the same challenge in the future generation such that a stable PUF response is provided at different time instances in response to the same challenge. Alternatively or additionally the PUF generates a PUF response based on the challenge to be used when creating the DEK.

Step 304: Helper data 226 is generated based on the PUF response (authentication response) and/or knowledge regarding the PUF 204 in general, e.g. discarding of unstable bits. The helper data 226 is saved in the credential storage 220. Optionally, the error correction module 208 uses the helper data 226 to perform an error correction on future PUF responses (e.g., based on the same challenge). In additional or alternatively, the error correction module 208 may perform error correction on the PUF response generated in step 302 for authentication based on helper data (e.g., knowledge regarding the PUF 204 in general or other helper data previously generated and stored for the PUF 204) to thereby provide an error-corrected PUF response as the authentication response.

Step 306: The (error-corrected) PUF response to be used when authenticating the SED 200 is provided to the host 202 where it is stored to enable authentication of the SED 200 at some later time instance(s), e.g., at boot up of the host 202. This may be the only time the (error-corrected) PUF response is provided in cleartext to the host 202.

Steps 308, 312, 314: The DEK generation module 214 (e.g., KDF 214-1) receives the (error-corrected) PUF response to be used when creating the DEK as an input (step 308). The host 202 may additionally provide the credential 248 to the DEK generation module 214 (e.g., KDF 214-1) (step 310). Based on the received credential 248 and the (error-corrected) PUF response, the DEK generation module 214 (e.g., KDF 214-1) generates a DEK and forwards the DEK to the OWF 216-2. Then, the OWF 216-2 generates a one-way transformed version of the DEK and stores the one-way transformed version of the DEK (OWF-transformed key 224) in the credential storage 220 (step 314).

Figure 4:
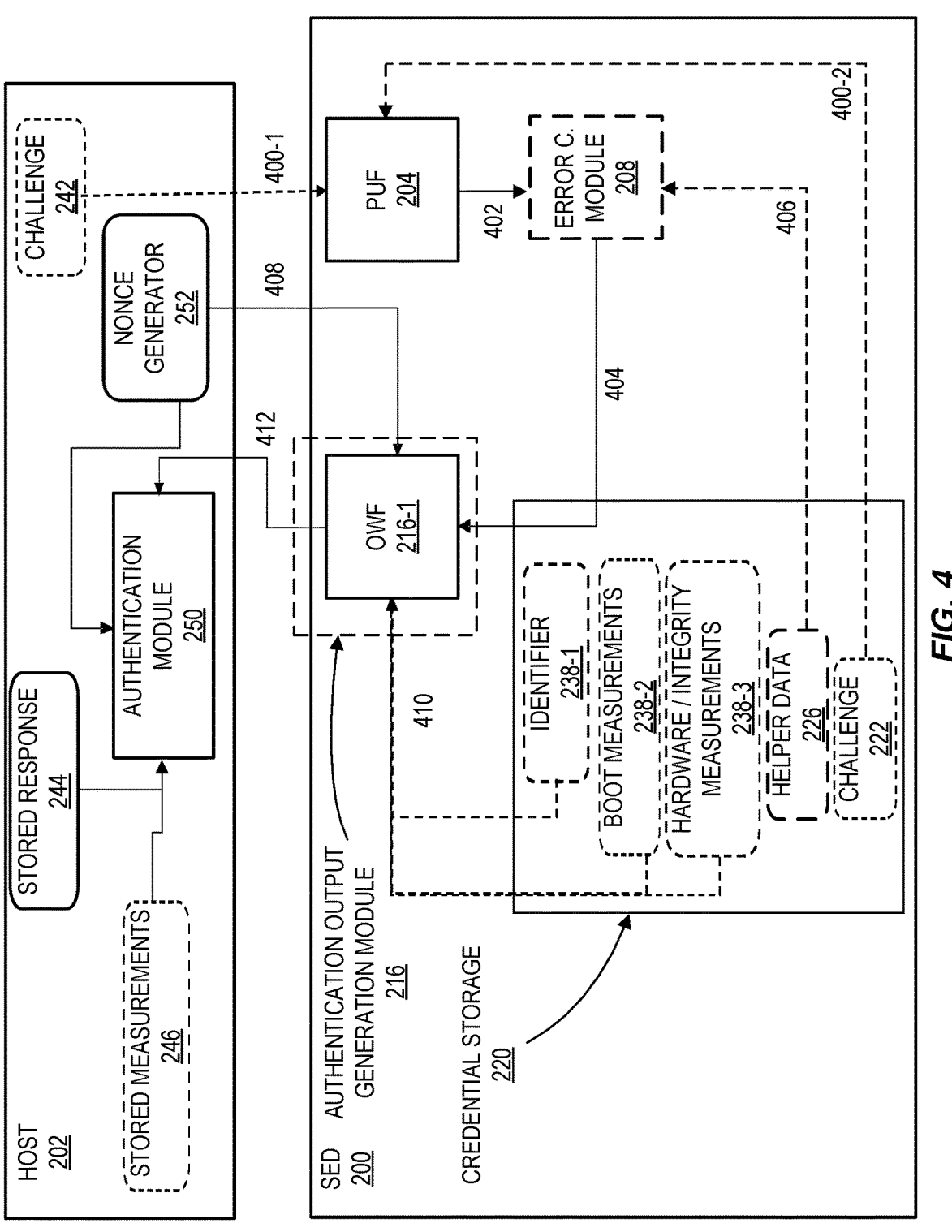
FIG. 4 illustrates one example of the SED that generates an authentication output based on a PUF response and a nonce and that provides the authentication output to the host during an authentication phase in accordance with one embodiment of the present disclosure.

FIG. 4 illustrates one example of the SED 200 that generates an authentication output based on a PUF response and a nonce, and that provides the authentication output to the host during the authentication phase in accordance with one embodiment of the present disclosure.

In the present disclosure, the host 202 supplies the credential 248 to the SED 200 in order to unlock the SED 200. However, the host 202 authenticates the SED 200 prior to the host 202 providing any credentials to the SED 200. The SED 200 is authenticated using a shared symmetric secret key, which is derived by the PUF 204 of the SED 200 as follows:

Step 400: The PUF 204 either uses the stored challenge 222 to generate a PUF response (step 400-1) or obtains the challenge 242 from the host 202 as a part of the authentication procedure (step 400-2). The challenge must be the same challenge as in the registration phase.

Step 402: Using the challenge, the PUF 204 generates a PUF response, which is used to authenticate the SED 200. In this embodiment, the PUF response (or an error corrected version of the PUF response) is used as an authentication response.

Steps 404 and 406: Optionally, if the PUF response may contain errors compared to the PUF response generated during the registration phase, the error correction module 208 performs error correction of the PUF response (e.g., based on associated helper data 226) to provide an error-corrected PUF response (step 404). In one embodiment, the previously generated helper data 226 used to perform error correction of the PUF response is obtained from credential storage 220 (step 406).

Step 408: Each authentication of the SED 200 includes a fresh nonce (number used once). Thus, a nonce generator 252 of the host 202 provides a nonce to the SED 200. The nonce does not necessarily have to be unpredictable but must not have been used previously.

Step 410: Optionally, the OWF 216-1 obtains additional values (i.e., measurements that correspond to the stored measurements 246 at the host) as an input to generate the output (i.e., the transformed authentication response) (step 410). These additional values may be the manufacturer-programmed identifiers 238-1, the boot measurements 238-2 (e.g., digests from booted components and activation of debug mode), or the hardware measurements 238-3 (e.g., states of physical components and integrity of casing). Note that the additional values must correspond to the additional values used to generate the authentication response during the registration phase of FIG. 3.

Step 412: The OWF 216-1 generates an output based on the received nonce, the (error-corrected) PUF response (authentication response), and optionally the additional values to provide an output. This output is referred to herein as a transformed authentication response. This transformed authentication response is provided to the host 202, where it is processed by an authentication module 250 of the host 202. In particular, the authentication module 250 of the host 202 compares the transformed authentication response received from the SED 200 with a corresponding transformed version of the stored response 244. If they match, then authentication is successful.

By knowing the nonce and the stored PUF response (and optionally the stored measurements 246), the authentication module 250 of the host 202 can generate a transformed version of the stored response 244 that should match the transformed authentication response received from the SED 200 if the SED 200 is legitimate. If the OWF 216-1 obtains the additional values as the input to generate the transformed authentication response, the host 202 must also know the correct values (i.e., the stored measurements 246) for those respective additional values. The host 202 may ask the SED 200 to provide the additional measurements, if an authentication attempt is failed, to enable debugging. If authentication is successful, the host 202 provides the credential 248 to the SED 200. If authentication is not successful, the host 202 does not provide a credential to the SED 200 and may additionally request some of the additional parameters to be able to investigate the failure of the authentication.

Figure 5:
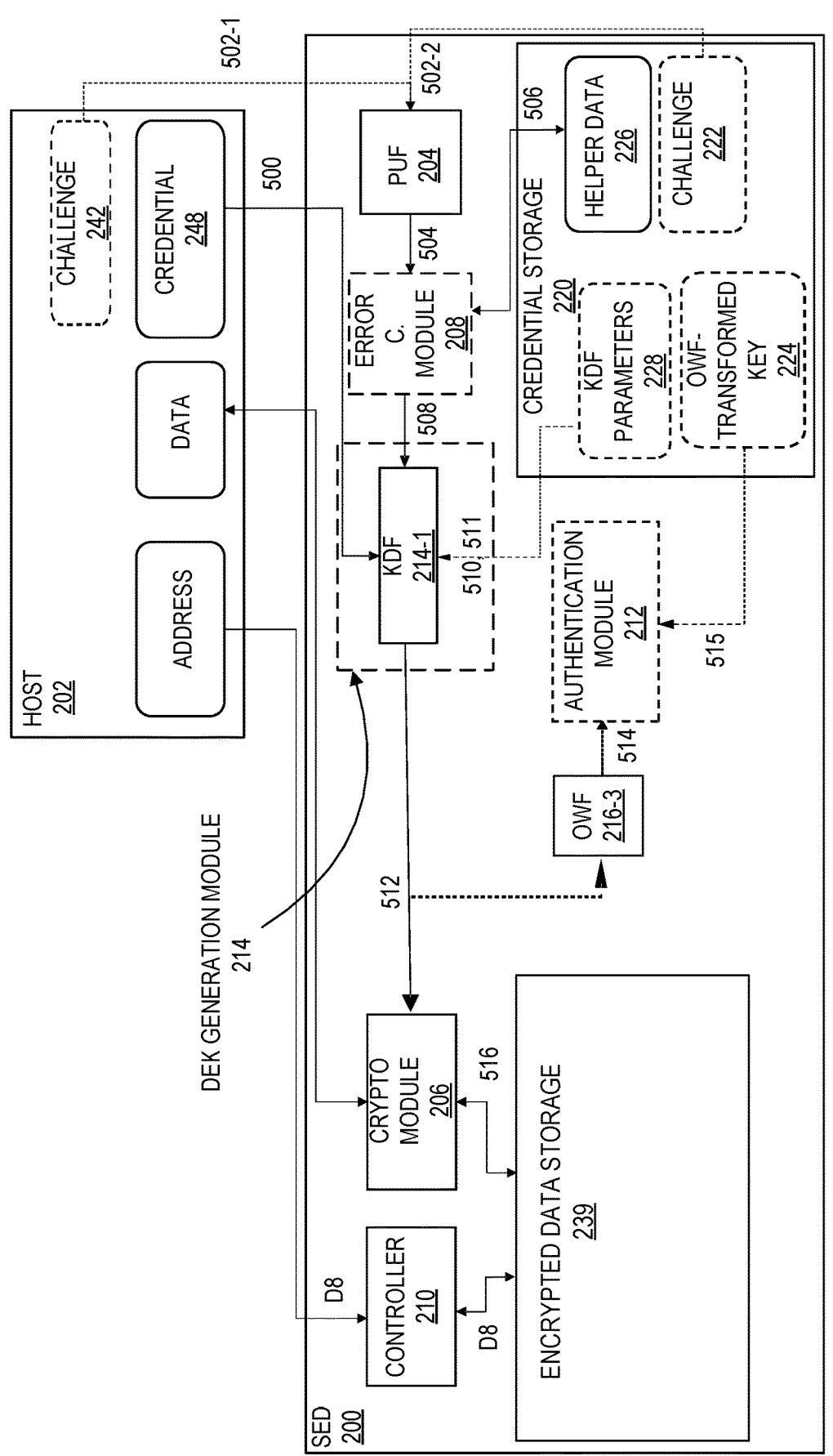
FIG. 5 illustrates one example of the SED that generates a DEK based on a PUF response and a credential received from the host in accordance with one embodiment of the present disclosure.

FIG. 5 illustrates one example of the SED 200 that generates a DEK based on a PUF response and a credential received from the host 202.

Step 500: The credential 248 from the host 202 is provided to the KDF 214-1.

Step 502: The PUF 204 receives the challenge, either from the host 202 or from the credential storage 220.

Step 504: The PUF 204 generates a PUF response based on the challenge.

Steps 506, 508: Optionally, the error correction module 208 obtains the helper data 226 from the credential storage 220 (step 506) and performs an error correction on the PUF response based on the helper data 226 (step 508) to thereby provide an error-corrected PUF response.

Steps 510, 511: The KDF 214-1 obtains the KDF parameters 228 from the credential storage 220 (step 510) and is configured by the KDF parameters 228 (step 511).

Step 512: The KDF 214-1 generates a DEK based on the received credential 248 and the (error-corrected) PUF response and provides the KDF to the crypto module 206 and the OWF 216-3.

Steps 514, 515: Based on the DEK, the OWF 216-3 generates and forwards an authentication output to the authentication module 212 (step 514). The authentication module 212 obtains the OWF-transformed key 224 from the credential storage 220 (step 515), compares the authentication output with the OWF-transformed key 224, and validates the authentication output from the OWF 216-3. By validating the authentication output, the authentication module 212 authenticates that the credential 248, which is used to generate the authentication output, is valid. Also, by validating the authentication output, the authentication module 212 authenticates the DEK, which is also used to generate the authentication output, is valid. If the DEK is not valid, the process is aborted.

Step 516: The DEK is loaded into the crypto module 206 used to seamlessly encrypt/decrypt the SED 200. When the host 202 requests a write, the incoming data is encrypted by the DEK prior to storing it on the SED 200. When the host 202 requests a read, the outgoing data is decrypted by the DEK prior to supplying it to the host 202 (step 516). Also, the KDF 214-1 forwards the DEK to the OWF 216-3 (step 518).

Figure 6:
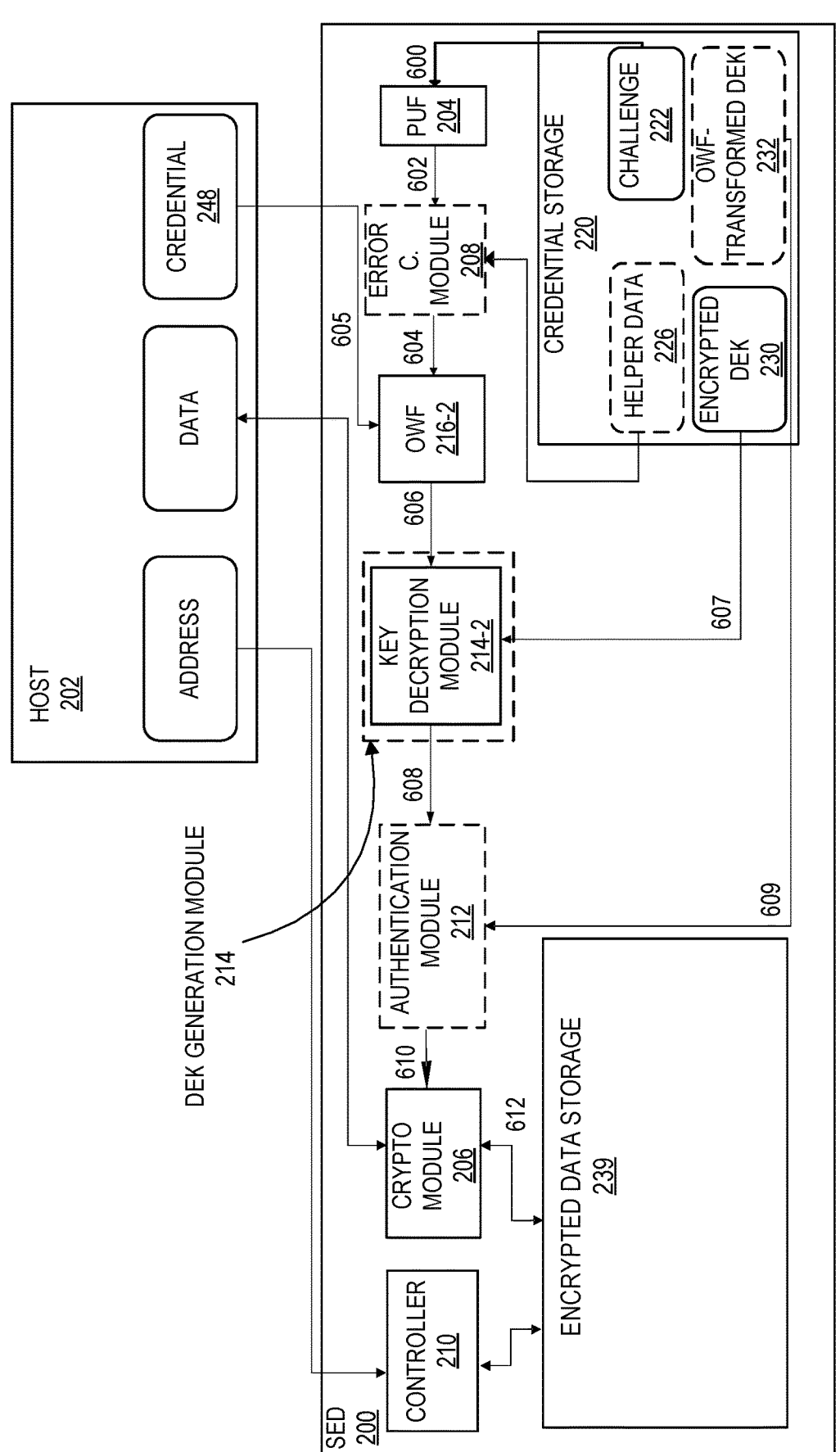
FIG. 6 illustrates one example of the SED that generates an output based on the combination of a PUF response and a credential received from the host and uses the output to decrypt an encrypted DEK in accordance with one embodiment of the present disclosure.

FIG. 6 illustrates one example of the SED 200 that generates an output based on the combination of a PUF response and a credential received from the host 202 and uses the output to decrypt an encrypted DEK.

Step 600: The PUF 204 obtains the challenge 222 from the credential storage 220.

Step 602: The PUF 204 generates a PUF response based on the challenge 222.

Step 604: Optionally, the error correction module 208 obtains the helper data 226 from the credential storage 220 and performs an error correction on the PUF response based on the helper data 226 to thereby provide an error-corrected PUF response.

Steps 605, 606: The OWF 216-2 receives the credential 248 from the host 202 (step 605). Based on the received credential 248 and the (error-corrected) PUF response, the OWF 216-2 generates and forwards a transformed output to the DEK generation module 214 (e.g., key decryption module 214-2) (step 606).

Steps 607, 608, 609: The DEK generation module 214 (e.g., key decryption module 214-2) obtains an encrypted DEK 230 from the credential storage 220 (step 607) and decrypts the encrypted DEK with the transformed output. Then, the DEK generation module 214 (e.g., key decryption module 214-2) forwards the decrypted DEK to the crypto module 202 (step 610) or, optionally, the authentication module 212 (step 608). The authentication module 212 obtains a hashed DEK 232 from the credential storage 220 (step 609) and authenticates the decrypted DEK with the OWF-transformed DEK 232.

Step 612: The decrypted DEK is loaded into the crypto module 206 used to seamlessly encrypt/decrypt the SED 200. When the host 202 requests a write, the incoming data is encrypted by the DEK prior to storing it on the SED 200. When the host 202 requests a read, the outgoing data is decrypted by the DEK prior to supplying it to the host 202.

Figure 7:
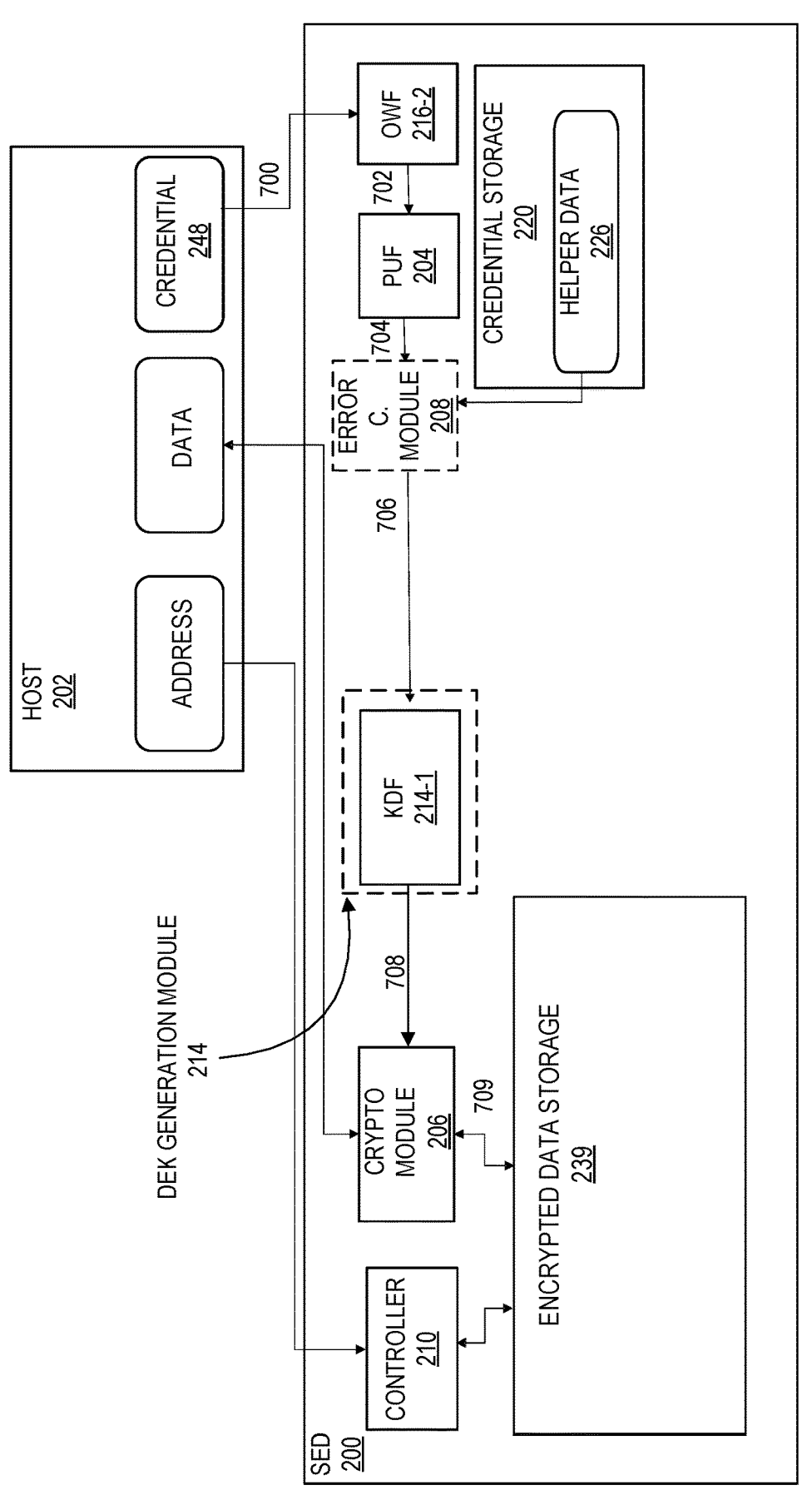
FIG. 7 illustrates one example of the SED that uses a credential received from the host to generate a challenge.

FIG. 7 illustrates one example of the SED that uses the credential 248 received from the host 202 to generate a challenge.

Step 700: The OWF 216-2 receives the credential 248 from the host 202.

Step 702: The OWF 216-2 generates an output based on the credential 248 and provides the output to the PUF 204 as a challenge.

Step 704: The PUF 204 generates a PUF output based on the output received from OWF 216-2.

Step 706: Optionally, the error correction module 208 obtains the helper data 226 from the credential storage 220 and performs an error correction on the PUF response based on the helper data 226 to thereby provide an error-corrected PUF response. The (error-corrected) PUF response is provided to the DEK generation module 214 (e.g., KDF 214-1).

Step 708: The DEK generation module 214 (e.g., KDF 214-1) generates a DEK based on the (error-corrected) PUF response.

Step 709: The DEK is loaded into the crypto module 206 used to seamlessly encrypt/decrypt the SED 200. When the host 202 requests a write, the incoming data is encrypted by the DEK prior to storing it on the SED 200. When the host 202 requests a read, the outgoing data is decrypted by the DEK prior to supplying it to the host 202.

Figure 8:
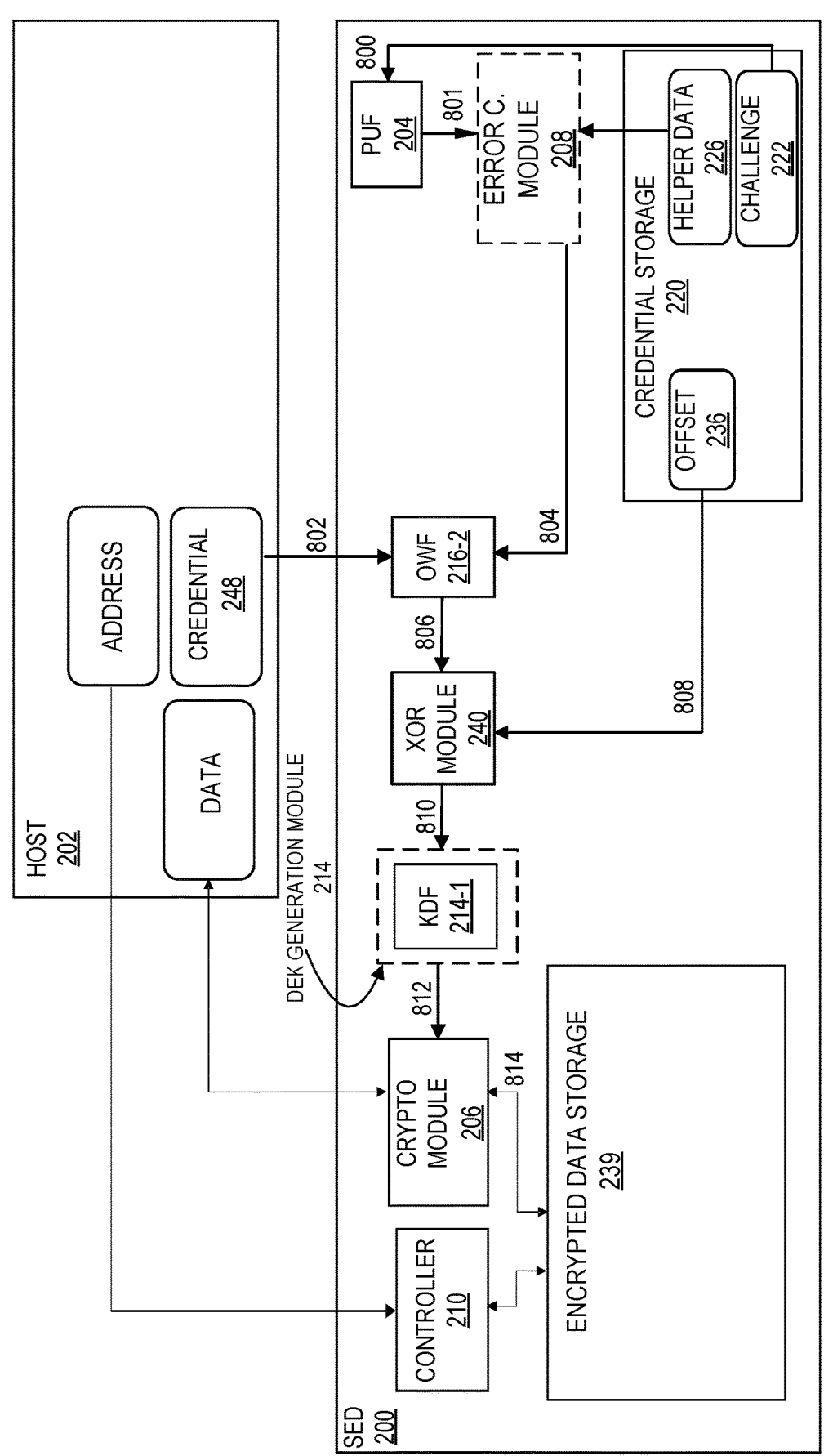
FIG. 8 illustrates one example of the SED that generates a common DEK based on PUF responses and multiple credentials received from the host by using an eXclusive OR (XOR) module and offset data in accordance with one embodiment of the present disclosure.

FIG. 8 illustrates one example of the SED 200 that generates a common DEK based on PUF responses and multiple credentials received from the host 202. As described below, in this embodiment, this is done by using the XOR module 240 and the offset 236. When a first user provides its credential ("first credential") to the SED 200, a DEK is generated by the PUF 204 and the DEK generation module 214 (e.g., the KDF 214-1) based on the first credential as discussed above and illustrated in the figures (e.g., FIG. 5). Now, assuming that the same DEK is to be generated for a second user (e.g., the first and second users have different credentials for unlocking the SED 200 or a particular range(s) of data stored in the encrypted data storage 239), it is desirable for the same DEK to be generated based on the credentials of the second user as was generated based on the credential of the first user. To accomplish this, the offset 236 is stored in credential storage 220 in association with the second user, where the offset 236 is an offset (e.g., the binary difference) between the first PUF response output by the PUF 204 based on the credential of the first user and a second PUF output by the PUF 204 based on the credential of the second user.

Step 800: The PUF 204 obtains the challenge 222 from the credential storage 220.

Step 801: The PUF 204 generates a PUF response.

Step 802: The OWF 216-2 receives the credential 248 from the host 202.

Step 804: Optionally, the error correction module 208 obtains the helper data 226 from the credential storage 220 and performs an error correction on the PUF response based on the helper data 226 to thereby provide an error-corrected PUF response. The (error-corrected) PUF response is provided to the OWF 216-2.

Step 806: The OWF 216-2 generates an output based on the credential 248 and the (error-corrected) PUF response.

Steps 808, 810: The XOR module 240 generates an XOR output based the output received from the OWF 216-2 and the offset 236 obtained from the credential storage 220.

Step 812: The DEK generation module 214 (e.g., KDF 214-1) generates a DEK based on the XOR output.

Step 814: The DEK is loaded into the crypto module 206 used to seamlessly encrypt/decrypt the SED 200. When the host 202 requests a write, the incoming data is encrypted by the DEK prior to storing it on the SED 200. When the host 202 requests a read, the outgoing data is decrypted by the DEK prior to supplying it to the host 202.

Importantly, by using the output of the XOR module 240, the input used by the DEK generation module 214 (e.g., the KDF 214-1) is the same as that used when the credential of the first user is supplied to the SED 200 and, as such, the generated DEK is the same DEK generated based on the first credential. Thus, in this embodiment, by using the offset 236 and the XOR module 240, multiple users' credentials may be used to create the same DEK. The method may also be used to enable a user to update a credential and still generate the same DEK.

Figure 9:
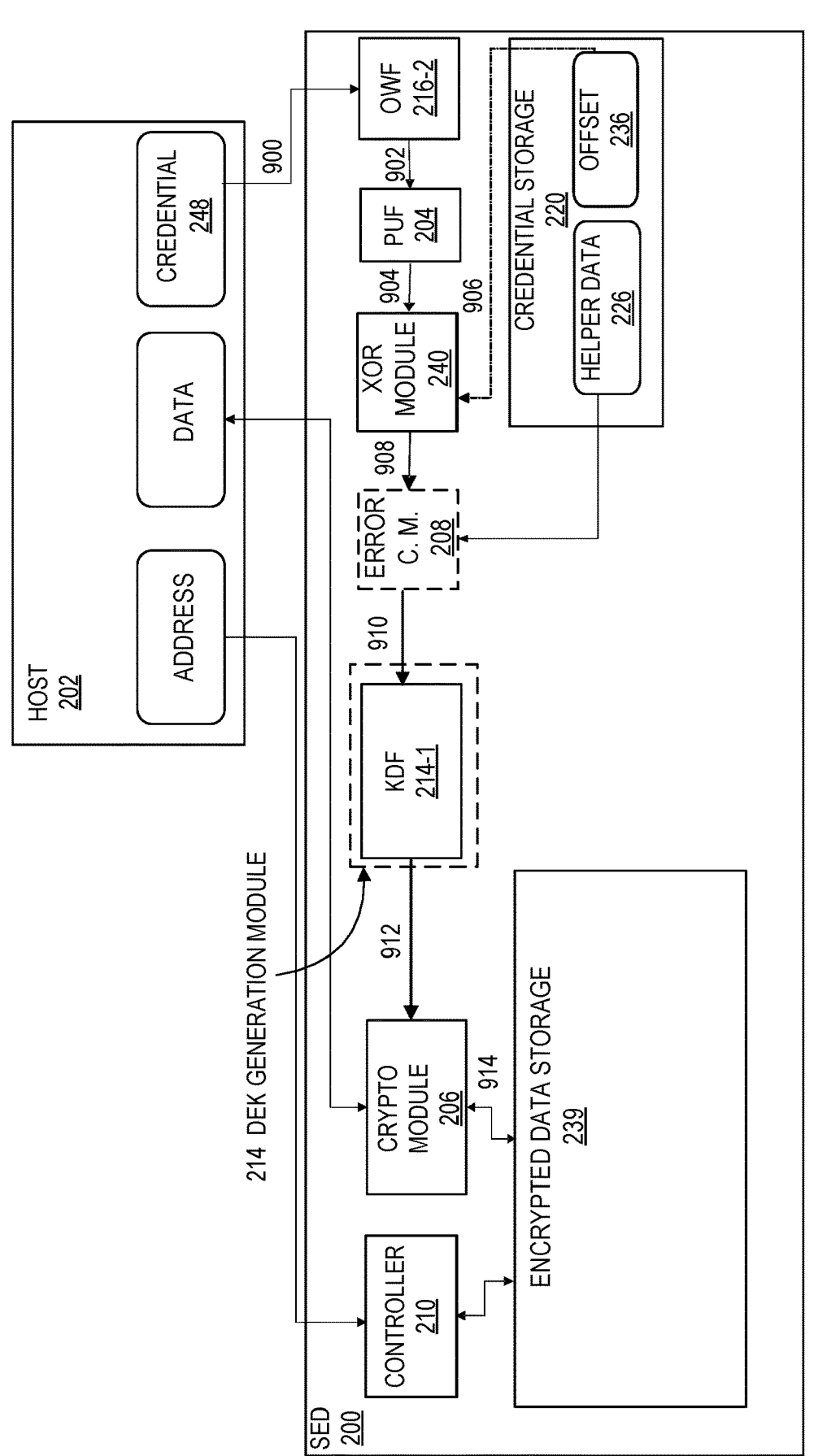
FIG. 9 illustrates another example of the SED that generates a common DEK based on PUF responses and multiple credentials received from the host by using the XOR module and offset data in accordance with one embodiment of the present disclosure.

FIG. 9 illustrates another example of the SED that generates a common DEK based on PUF responses and multiple credentials received from the host 202.

Step 900: The OWF 216-2 receives the credential 248 from the host 202.

Step 902: The OWF 216-2 generates an output based on the credential 248.

Step 904: The PUF 204 generates a PUF response based on the output from the OWF 216-2.

Steps 906, 908: The XOR module 240 generates an XOR output based on the PUF response and the offset 236 obtained from the credential storage 220.

Step 910: Optionally, the error correction module 208 obtains the helper data 226 from the credential storage 220 and performs an error correction on the XOR output based on the helper data 226 to thereby provide an error-corrected XOR output. The (error-corrected) XOR output is provided to the DEK generation module 214 (e.g., KDF 214-1).

Steps 912, 914: The DEK generation module 214 (e.g., KDF 214-1) generates a DEK based on the (error-corrected) XOR output (step 912). The DEK is loaded into the crypto module 206 used to seamlessly encrypt/decrypt the SED 200. When the host 202 requests a write, the incoming data is encrypted by the DEK prior to storing it on the SED 200. When the host 202 requests a read, the outgoing data is decrypted by the DEK prior to supplying it to the host 202 (step 914).

Alternative Embodiments

In some embodiments, DEKs can be revoked. When a DEK is deleted, the PUF response used to generate the key can still be produced. This is solved by removing the transformed key from the credential storage, thereby making the key invalid. An attacker is not able to access the encrypted data even if the credential has been compromised. In some embodiments, challenges used during authentications of the SED 200 can also be revoked. This feature can be obtained by using an erasable PUF, where the challenge may be blacklisted to produce a null response. Alternatively, the PUF can be physically altered to generate a different response for a specific challenge. Alternatively, the SED 200 can maintain a blacklist of challenges that have been revoked and are not allowed to be passed through to the PUF.

In one embodiment, all data on the device can be invalidated by reconfiguring the PUF 204. A reconfigurable PUF has an internal state, either logical or physical, which can be used to alter the entire set of CRPs. This causes all data on the disk to be destroyed as none of the keys generated by the PUF 204, used for encryption and decryption of the data, will be possible to derive again after the reconfiguration.

The present disclosure discusses the method of generating the key in the context of the SED 200. The method is, however, applicable for all types of encrypted storage devices and can easily be used by integrated components in phones and tablets (e.g., flash memories) as well as external Universal Serial Bus (USB) connected drives. By protecting the communication channel between the host 202 and the SED 200, e.g., by asymmetric cryptography, the method can also be used for cloud-based storage devices.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

| AES | Advanced Encryption Standard |
|---|---|
| AK | Authentication Key |
| ATA | Advanced Technology Attachment |
| BBRAM | Battery Backup Random Access Memory |
| CPU | Control Processing Unit |
| CRP(s) | Challenge-Response Pairs |
| DEK | Data Encryption Key |

20

-continued

| DMA | Direct Memory Access |
|---|---|
| FDE | Full Disk Encryption |
| HMAC | Hash-based Message Authentication Code |
| KDF | Key Derivation Function |
| KEK | Key Encryption Key |
| LRW | Liskov, Rivest, and Wagner |
| MEK | Media Encryption Key |
| NONCE | Number used only once |
| OTP | One-Time Programmable |
| OWF | One-Way Function |
| PBKDF2 | Password-Based Key Derivation Function 2 |
| PRNG | Pseudo Random Number Generator |
| PUF | Physically Unclonable Function |
| RAM | Random-Access Memory |
| SED | Self-Encrypting Drive |
| SRAM | Static Random-Access Memory |
| SSD | Solid-State Drive |
| TCG | Trusted Computing Group |
| USB | Universal Serial Bus |
| XOR | exclusive OR |
| XTS | XOR-encrypt-XOR Tweaked-codebook mode with ciphertext Stealing |

Those skilled in the art will recognize improvements and modifications to the embodiments of the present disclosure. All such improvements and modifications are considered within the scope of the concepts disclosed herein.

The invention claimed is:

1. A storage device for protecting data, the storage device comprising circuitry that is configured to:
   generate a first Physically Unclonable Function (PUF) response based on a first challenge; and
   generate a second PUF response based on a second challenge;
   obtain a nonce provided by a host;
   obtain a first input related to the first PUF response;
   generate an authentication output based on the first input and the nonce using a first One-Way Function, OWF; and
   provide the authentication output to the host;
   generate a Data Encryption Key (DEK) based on at least the second response;
   obtain the DEK perform encryption of data from the host to be stored in encrypted data storage of the storage device using the DEK and/or decryption of data being accessed by the host from the encrypted data storage of the storage device using the DEK; and
   perform error correction of the first PUF response based on helper data to provide an error-corrected PUF response as the first input.

2. The storage device of claim 1, wherein the circuitry is further configured to:
   obtain one or more parameters from storage and generate the authentication output based on the first input, the nonce, and the one or more parameters using the first OWF; and
   the one or more parameters comprise (a) an identifier of the storage device, (b) boot measurements about digests from booted components and activation of debug mode, (c) hardware or integrity measurements about states of physical components or integrity of casing, (d) a stored OWF configuration parameter, or (e) a combination of any two or more of (a)-(d).

3. The storage device of claim 1, wherein the circuitry is further configured to receive a credential from the host.

4. The storage device of claim 3, wherein the circuitry is configured to provide the authentication output to the host prior to the credential of the host being received at the storage device.

5. The storage device of claim 3, wherein the circuitry is further configured to obtain a second input related to the second PUF response; and
    generate a DEK based on at least the credential and the second input.

6. The storage device of claim 5, wherein the circuitry is further configured to perform error correction of the second PUF response based on helper data to provide a second error-corrected PUF response as the second input.

7. The storage device of claim 5, wherein the circuitry is further configured to receive the credential from the host, obtain the second input related to the second PUF response, and generate the DEK based on the second input and the credential.

8. The storage device of claim 3, wherein the circuitry is further configured to obtain a second input related to the second PUF response, receive the credential from the host, and generate a transformed output based on the second input and the credential; and
    obtain the transformed output from second OWF, obtain an encrypted DEK and decrypt the encrypted DEK based on the transformed output to thereby generate a DEK.

9. The storage device of claim 8, wherein the circuitry is further configured to perform error correction of the second PUF response based on helper data to provide an error-corrected second PUF response as the second input to the second OWF.

10. The storage device of claim 3, wherein the circuitry is further configured to:
    receive a credential from the host and generate a first output based on the credential;
    obtain the first output from a second OWF and generate a second PUF response based on the first output; and
    obtain an input related to the second PUF response and generate a DEK based on the input related to the second PUF response.

11. The storage device of claim 10, wherein the circuitry is further configured to generate the DEK based on the input related to the second PUF response.

12. The storage device of claim 10, wherein the circuitry is further configured to perform error correction on the second PUF response based on helper data to provide an error-corrected second PUF response.

13. A method performed by a storage device for protecting data, comprising:
    generating, by a Physically Unclonable Function, PUF, a first PUF response based on a first challenge;
    generating a second PUF response based on a second challenge;
    obtaining a nonce provided by a host;
    obtaining a first input related to the first PUF response;
    generating an authentication output based on the first input related to the first PUF response and the nonce using a first One-Way Function, OWF;
    providing the authentication output to the host;
    generating a DEK based on at least the second response; and

22 performing encryption of data from the host to be stored in encrypted data storage of the storage device using the DEK and/or decryption of data being accessed by the host from the encrypted data storage of the storage device using the DEK; and
    performing error correction of the first PUF response based on helper data to provide an error-corrected PUF response as the first input.

14. The method of claim 13 further comprising receiving a credential from the host, wherein providing the authentication output to the host is performed prior to the credential of the host being received at the storage device.

15. The method of claim 14 further comprising:
    obtaining a second input related to the second PUF response;
    generating, via a second OWF, a transformed output based on the second input and the credential;
    wherein generating the DEK comprises obtaining an encrypted DEK and decrypting the encrypted DEK based on the transformed output to thereby generate the DEK.

16. The method of claim 14 further comprising:
    generating a first output based on the credential;
    wherein:
        generating the second PUF response comprises generating the second PUF response based on the first output; and
        generating the DEK comprises obtaining an input related to the second PUF response and generating the DEK based on the input related to the second PUF response.

17. The method of claim 14 further comprising:
    obtaining an input related to the second PUF response;
    generating, by a second OWF, an output based on the input and the credential;
    obtaining an offset associated with a user of the host; and
    generating an XOR output based on the output and the offset;
    wherein generating the DEK comprises generating the DEK based on the XOR output.

18. The method of claim 14 further comprising:
    generating, by a second OWF, an output based on the credential;
    generating a second PUF response based on the output;
    obtaining an offset associated with a user of the host; and
    generating an XOR output based on the second PUF response and the offset; and
    wherein generating the DEK comprises generating the DEK based on the XOR output.

19. The method of claim 13 further comprising:
    generating, by a third OWF, a transformed version of the DEK;
    obtaining a stored transformed version of the DEK; and
    authenticating the DEK based on a comparison of the generated transformed version of the DEK and the stored transformed version of the DEK.

\*   \*   \*   \*   \*